United States Patent
Deore et al.

(10) Patent No.: US 10,690,278 B2
(45) Date of Patent: Jun. 23, 2020

(54) COUPLING ASSEMBLY WITH VIBRATION LOCK

(71) Applicant: Eaton Corporation, Cleveland, OH (US)

(72) Inventors: Hemant P. Deore, Maharashtra (IN); Ashok K. Vishwakarma, Maharashtra (IN)

(73) Assignee: Eaton Intelligent Power Limited, Dublin (IE)

( * ) Notice: Subject to any disclaimer, the term of this patent is extended or adjusted under 35 U.S.C. 154(b) by 498 days.

(21) Appl. No.: 15/324,407

(22) PCT Filed: Jul. 10, 2015

(86) PCT No.: PCT/US2015/039891
§ 371 (c)(1),
(2) Date: Jan. 6, 2017

(87) PCT Pub. No.: WO2016/007826
PCT Pub. Date: Jan. 14, 2016

(65) Prior Publication Data
US 2017/0198848 A1    Jul. 13, 2017

Related U.S. Application Data

(60) Provisional application No. 62/022,914, filed on Jul. 10, 2014.

(51) Int. Cl.
*F16L 37/138*    (2006.01)
*F16L 37/133*    (2006.01)

(52) U.S. Cl.
CPC .......... *F16L 37/138* (2013.01); *F16L 37/133* (2013.01); *F16L 2201/10* (2013.01)

(58) Field of Classification Search
CPC ... F16L 37/138; F16L 37/133; F16L 2201/10; F16L 37/0845; F16L 37/34; F16L 37/53; F16L 37/00; F16L 37/08; F16L 37/0841; F16L 37/146
USPC .................. 285/317, 33, 305, 306, 308, 316
See application file for complete search history.

(56) References Cited

U.S. PATENT DOCUMENTS

| | | | |
|---|---|---|---|
| 5,489,125 A | 2/1996 | Hohmann |
| 5,553,895 A | 9/1996 | Karl et al. |
| 5,570,910 A | 11/1996 | Highlen |
| 6,494,494 B2 | 12/2002 | Vogel et al. |

(Continued)

FOREIGN PATENT DOCUMENTS

EP    2048425 A1    4/2009

OTHER PUBLICATIONS

International Search Report PCT/US2015/039891, dated Sep. 28, 2015.

*Primary Examiner* — Zachary T Dragicevich
*Assistant Examiner* — William S. Choi
(74) *Attorney, Agent, or Firm* — Fishman Stewart PLLC

(57) ABSTRACT

A coupling assembly (10) may include a first member (20) and a second member (40), a release sleeve (110) movably connected to the first member, a retainer sleeve (70), and a spring (100). The second member includes a second member flange (50). The spring may be configured to apply a spring force to the retainer sleeve. The spring force may biases the retainer sleeve into a positive engagement with the second member flange.

20 Claims, 11 Drawing Sheets

(56) References Cited

U.S. PATENT DOCUMENTS 6,592,151 B2     7/2003   Densel et al.
2012/0068454 A1*   3/2012   Hamaguchi ........... F16L 37/088
                                                                                 285/375

* cited by examiner

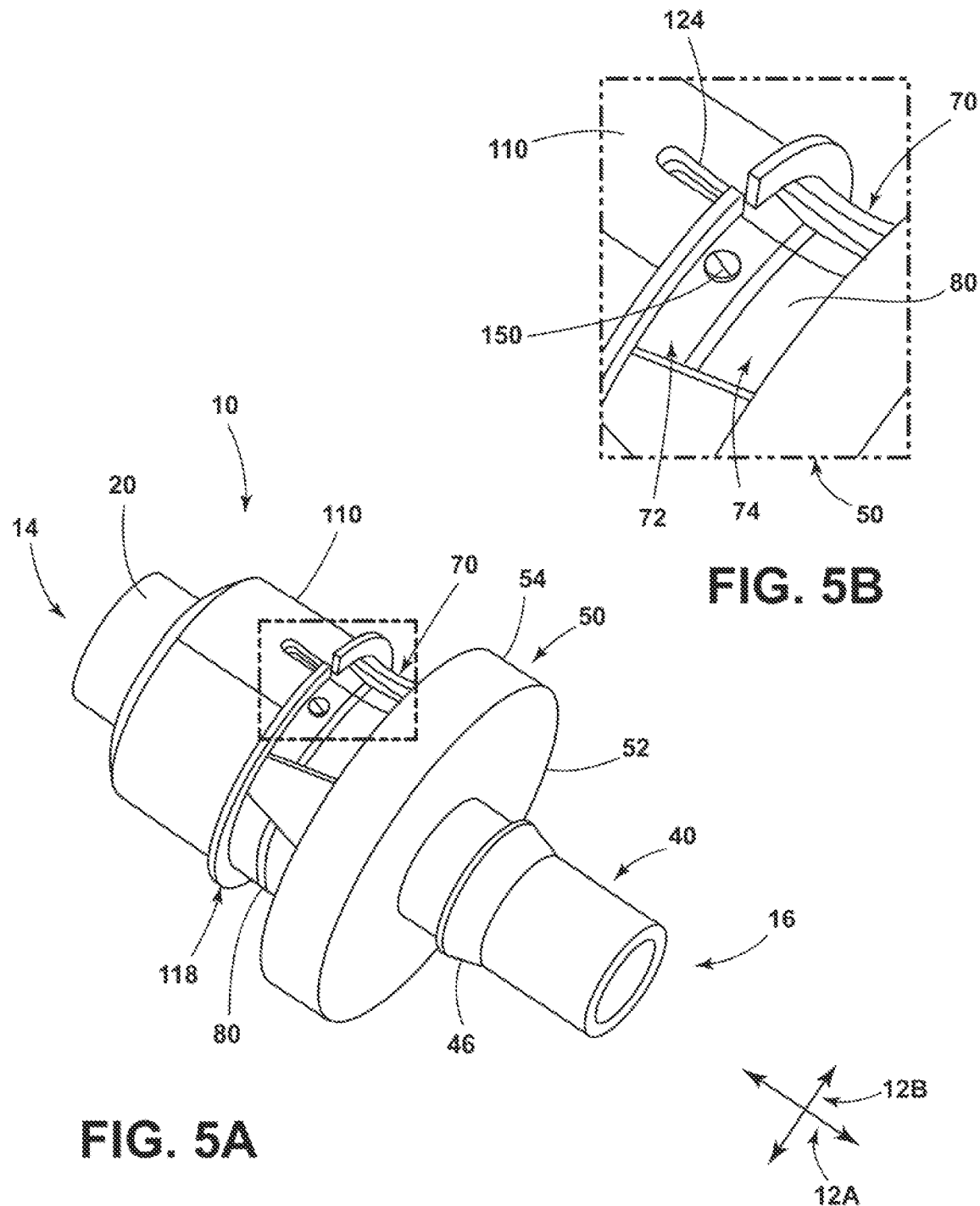

COUPLING ASSEMBLY WITH VIBRATION LOCK

CROSS REFERENCE TO RELATED APPLICATIONS

This application is a National Phase Application of PCT/US2015/039891, filed Jul. 10, 2015 which claims priority to U.S. Provisional Patent Application No. 62/022,914, filed Jul. 10, 2014, both of which are hereby incorporated by reference in their entirety.

BACKGROUND

The present disclosure generally relates to a coupling assembly for connecting two members together, including a releasable coupling assembly with a movable release sleeve.

SUMMARY

Embodiments of the present disclosure include a Snap-To-Connect (STC) joint with a vibration lock. Conventional STC joints are generally described in U.S. Pat. Nos. 5,553,895, 5,570,910, 6,494,494, and/or 6,592,151, each of which is assigned to the assignee hereof and each of which are hereby incorporated by reference as though fully set forth herein.

In embodiments, a coupling assembly may include a first member and a second member, a release sleeve movably connected to the first member, a retainer sleeve, and a spring. The second member may include a second member flange. The spring may be configured to apply a spring force to the retainer sleeve. The spring force may biases the retainer sleeve into a positive engagement with the second member flange. The coupling assembly may include a release sleeve lock ring configured to restrict movement of the release sleeve in at least one direction.

In embodiments, the spring may be configured to apply the spring force in an axial direction away from the second member. In embodiments, the retainer sleeve may include a vibration lock pin and the release sleeve may include a release slot that corresponds to the lock pin. In embodiments, the first member and the second member may be decoupled from each other if the release slot is aligned (e.g., radially) with the vibration lock pin. In embodiments, the first member may be configured as an adapter and the second member is configured as a nipple. In embodiments, an inner diameter of the first member may be smaller than an inner diameter of second member. In embodiments, a smaller inner diameter of the first member may be configured to increase fluid pressure and increase a locking force between the first member and the second member. In embodiments, the retainer sleeve may include a plurality of flexible locking lugs configured to engage a plurality of slots disposed in the second member flange. In embodiments, the spring force may bias the flexible locking lugs of the retainer sleeve into the positive engagement with the second member flange via the plurality of second member flange slots. In embodiments, at least one of the plurality of flexible locking lugs may include a hook configuration.

BRIEF DESCRIPTION OF THE DRAWINGS

FIG. 5A is a perspective view generally illustrating portions of a coupling assembly, in accordance with embodiments of the present disclosure.

FIG. 5B is an enlarged perspective view of portions of a coupling assembly of FIG. 5A, in accordance with embodiments of the present disclosure.

DETAILED DESCRIPTION

Figure 1A:
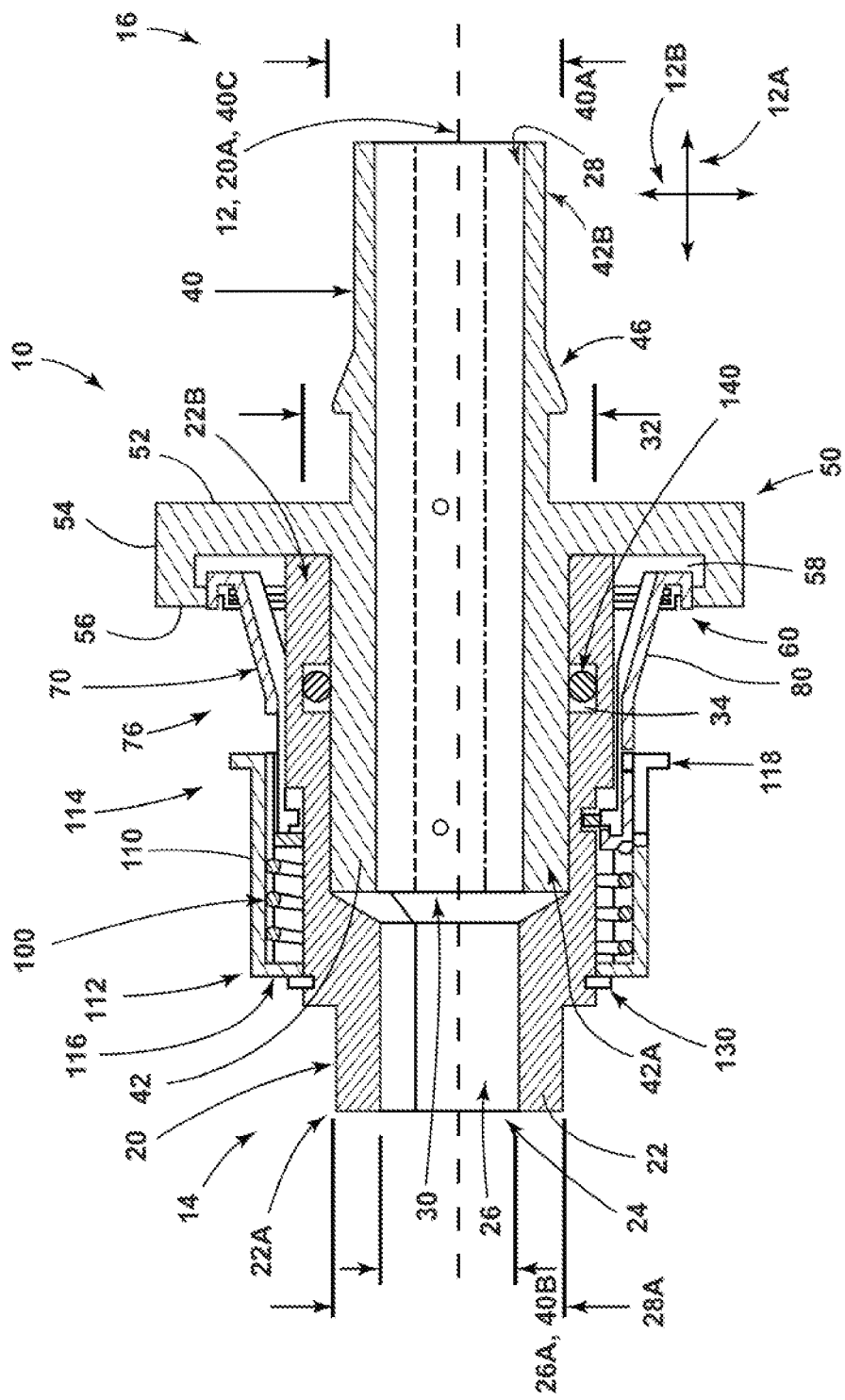
FIGS. 1A and 1B are cross-sectional views generally illustrating portions of a coupling assembly, in accordance with embodiments of the present disclosure.

Referring now to the drawings, FIGS. 1A, 1B, and 2A-2D generally illustrate a coupling assembly 10, a first member 20, a second member 40, a retainer sleeve 70, a spring 100, a release sleeve 110, a release sleeve lock ring 130, and a seal 140. In embodiments, coupling assembly 10 may include a central axis 12, an axial direction 12A may be generally parallel to central axis 12, and/or a radial direction 12B may be generally perpendicular to the axial direction 12A and/or central axis 12. Coupling assembly 10 may include a first end 14 and/or a second end 16.

In embodiments, first member 20 may include a body with a first end 22A, and/or a second end 22B. In embodiments, first member 20 may include an adapter and/or may be referred to herein as adapter 20. In embodiments, first member 20 may be generally annular, and may include one or more angled and/or chamfered portions 38 that may ease coupling or engagement (e.g., positive/locking engagement) of first member 20 and second member 40.

In embodiments, coupling assembly may include a passage 24, which may include a fluid passage. Passage 24 may be configured to provide fluid communication between first end 14 and second end 16 of coupling assembly 10.

In embodiments, passage 24 may include a first portion 26, a second portion 28, and a third portion 30. First portion 26 may include a first inner diameter 26A (or "first diameter") and/or second portion 28 may include a second inner diameter 28A (or "second diameter"). Second diameter 28A may be larger than first diameter 26A. Third portion 30 may be disposed between first portion 26 and second portion 28, and/or may be angled to compensate for different diameters of first and second portions 26, 28. Second portion inner diameter 28A may generally correspond to an outer diameter 40A of second member 40. First diameter 26A may generally correspond to an inner diameter 40B of second member 40. In embodiments, first portion 26 and/or third portion 30 may generally be disposed in first member 20, and/or second portion 28 may be disposed in second member 40.

In embodiments, second member 40 may include a body 42 that may be generally annular and may include a first end 42A, and/or a second end 42B. In embodiments, second member 40 may include a nipple and/or may be referred to herein as nipple 40. As generally illustrated in FIG. 1, a portion of the first member 20 may be configured to receive a portion of the second member 40 therein. Second portion 28 of passage 24 may be configured to provide fluid communication between first end 42A and second end 42B. In embodiments, body 42 may include an angled and/or chamfered portion 42C that may ease insertion of second member 40 into first member 20.

In embodiments, second member 40 may include a retaining feature 46, which may include one or more barbs. Retaining feature 46 may be configured to allow a fluid transmission element 48 (e.g., a tube, pipe, hose, etc.) to generally be pressed over it in one direction, but may generally restrict movement of fluid transmission element 48 in the opposite direction. For example, and without limitation, retaining feature 46 may allow fluid transmission element 48 to slide over it in first direction, but once a sufficient portion of fluid transmission element 48 has passed over retaining feature, retaining feature 46 may generally prevent or restrict fluid transmission element 48 from moving in the opposite direction (see, e.g., FIG. 4). In embodiments, retaining feature 46 may include a series of axially spaced barbs or ribs, and/or may include one or more threaded portions.

In embodiments, second member 40 may include a flange 50 that may be generally annular. Flange 50 may generally extend radially outward from body 42 and/or may be configured for engagement (e.g., positive engagement) with retainer sleeve 70. In embodiments, flange 50 may include a first portion 52, a second portion 54, and/or a third portion 56. First portion 52 may generally extend radially outward from body 42, second portion 54 may generally extend axially from first portion 52 generally toward first end 14, and/or third portion 56 may generally extend radially inward from second portion 54. First, second, and third portions 52, 54, 56 may be configured such that a semi-enclosed cavity 58 is formed between first portion 52, second portion 54, third portion 56, and body 42. In embodiments, second portion 54 may include one or more angled and/or chamfered portions 54A, 54B, such as generally illustrated in FIG. 1B.

In embodiments, third portion 56 may include one or more circumferential slots 60 that may be configured for engagement with retainer sleeve 70. In embodiments, slots 60 may include one or more of a variety of shapes, sizes, and/or configurations. In embodiments, third portion 56 may include four or more slots 60, each of which may correspond to a locking lug 80 of retainer sleeve 70. Slots 60 may be configured to extend all of the way or only part of the way through the thickness of third portion 56. Slots 60 may include a generally arcuate shape.

Figure 2A:
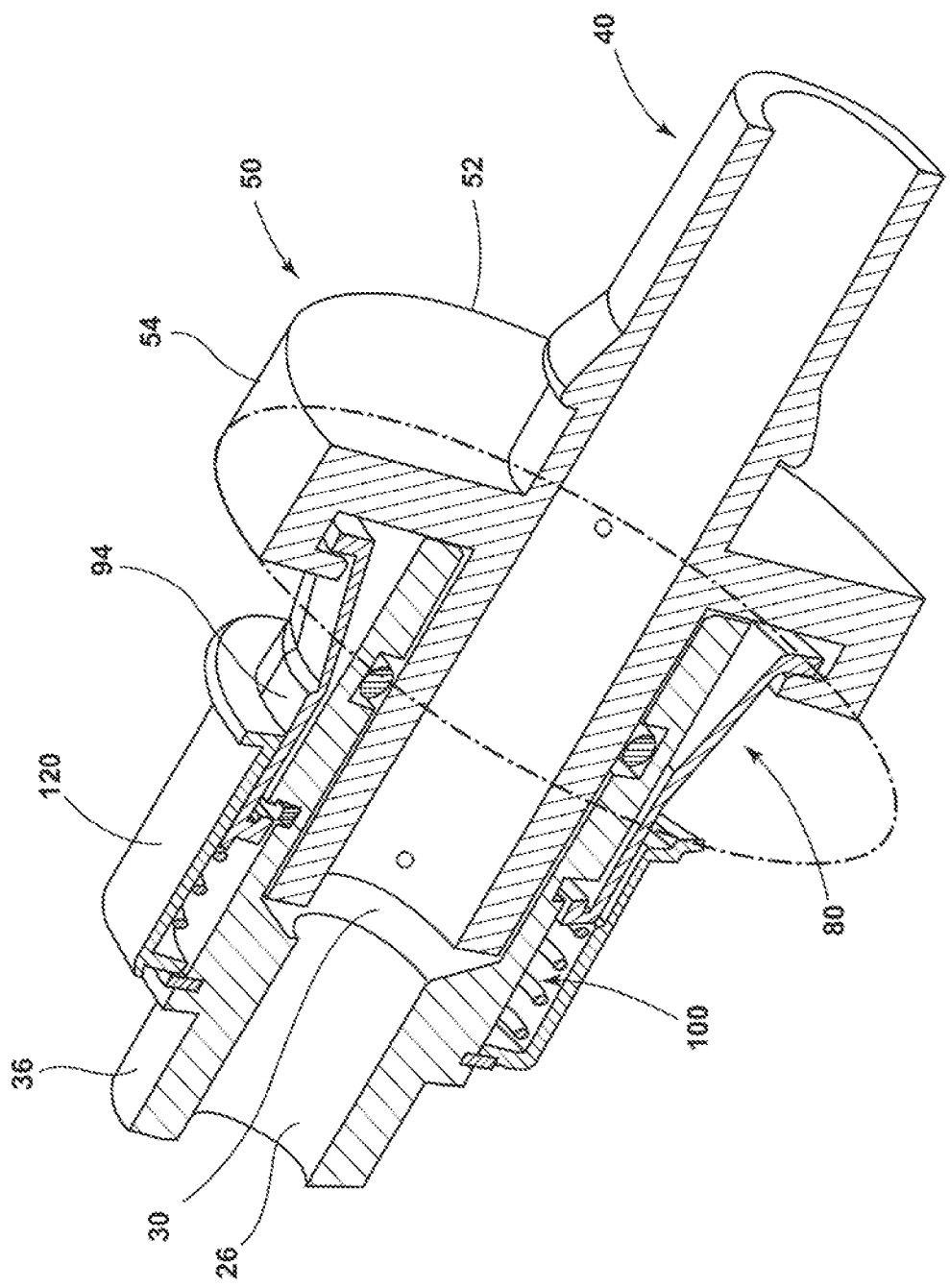
FIG. 2A-2D are cross-sectional perspective views generally illustrating portions of a coupling assembly, in accordance with embodiments of the present disclosure.
Figure 2B:
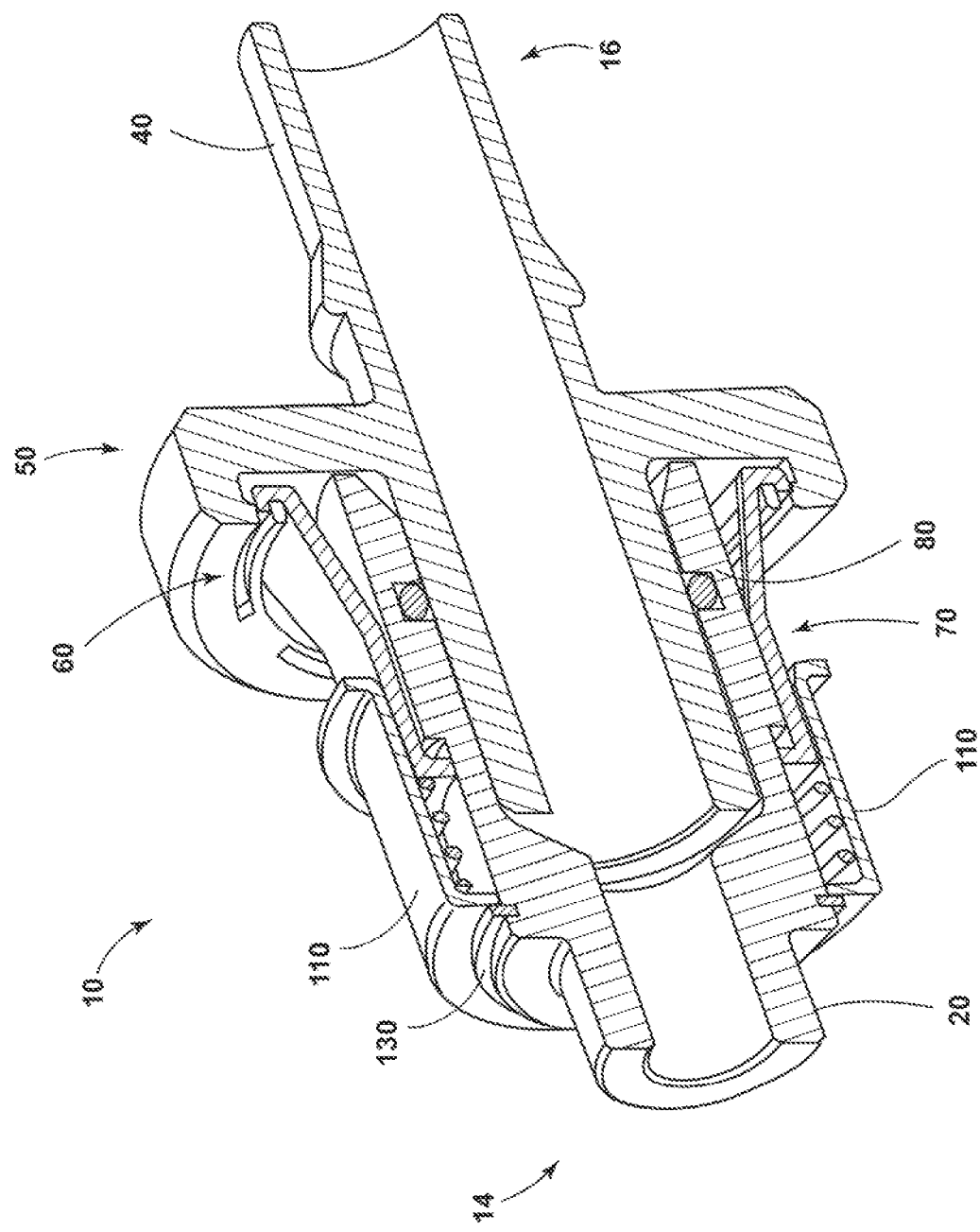
Figure 2C:
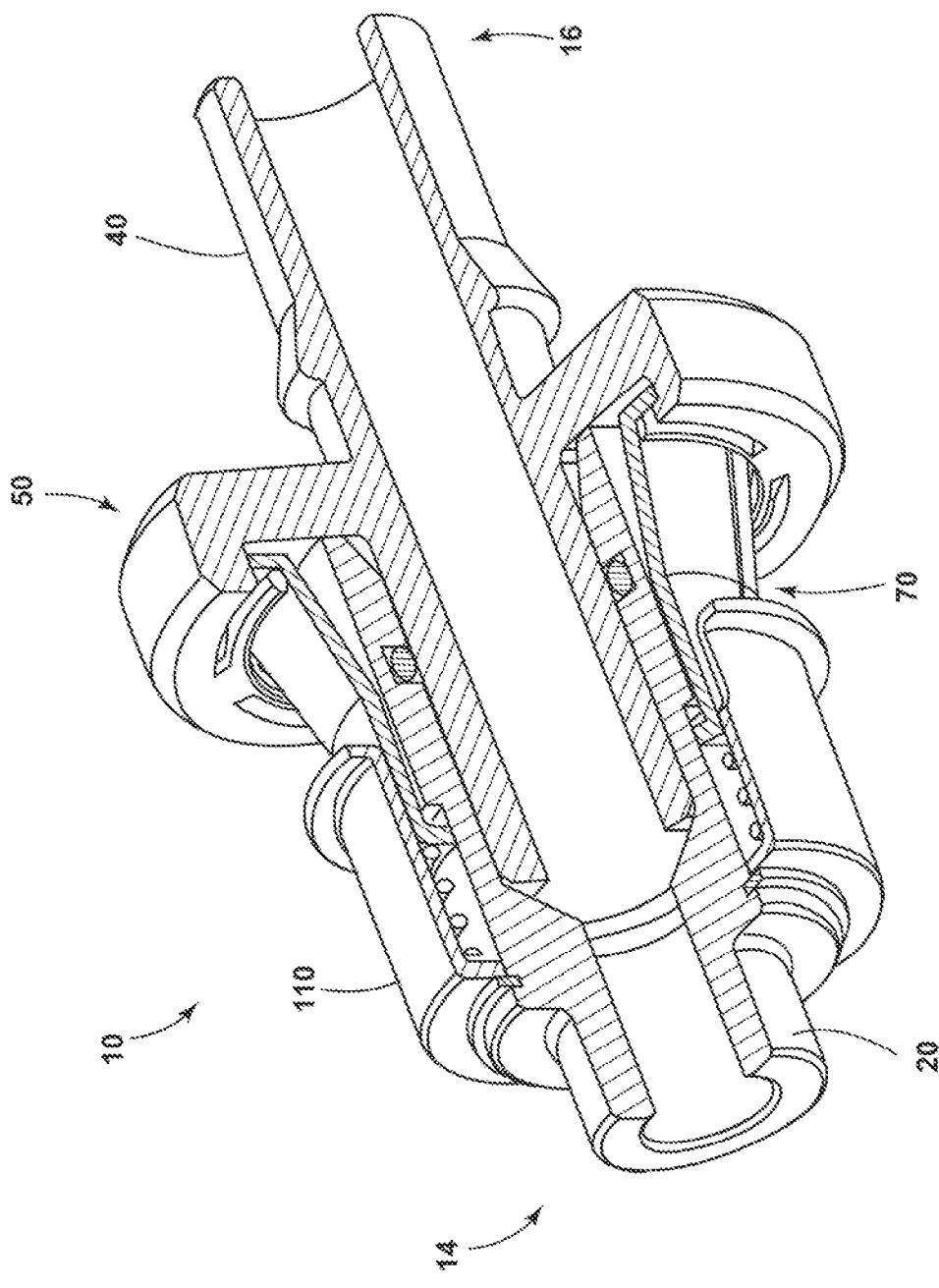
Figure 2D:
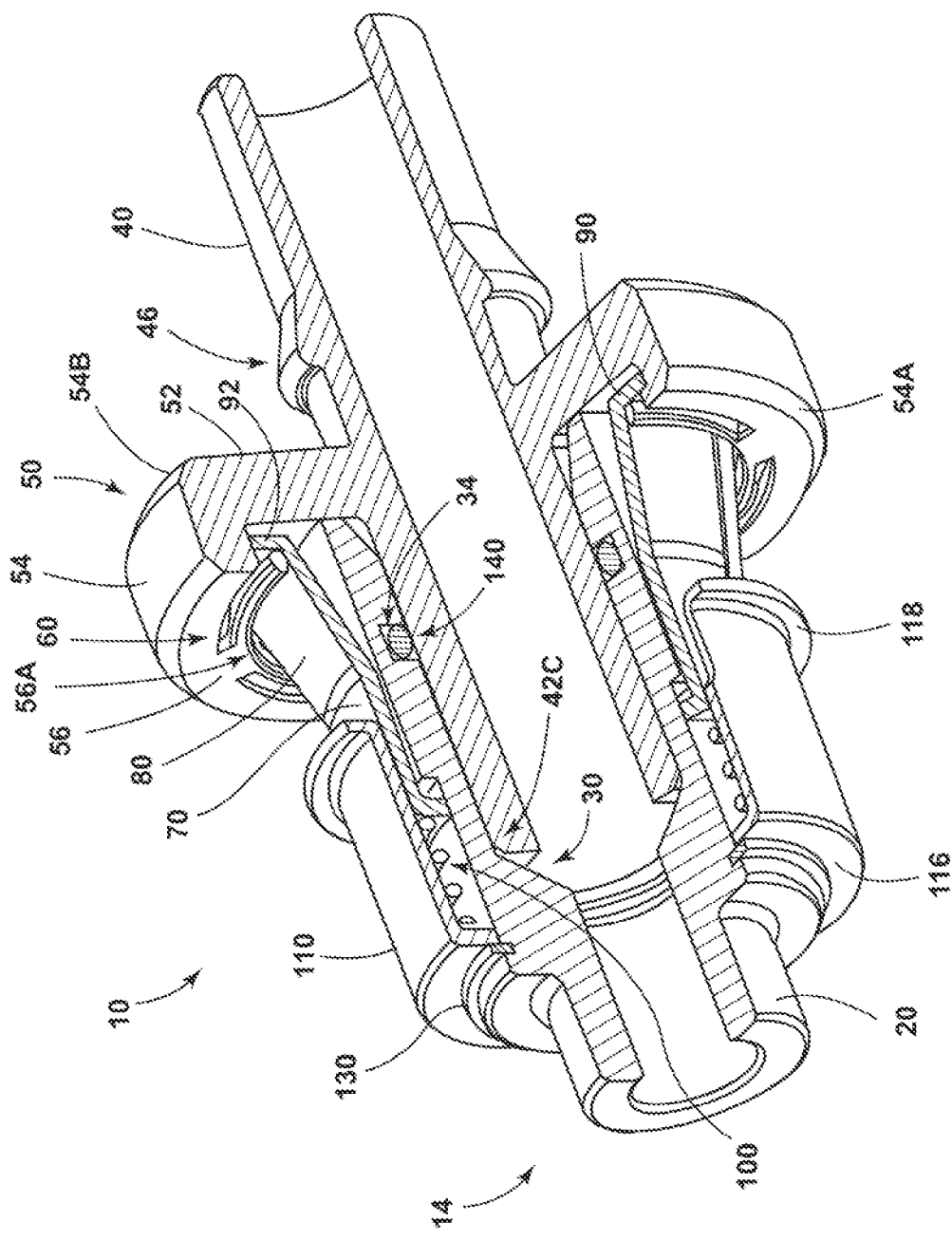
Figure 3A:
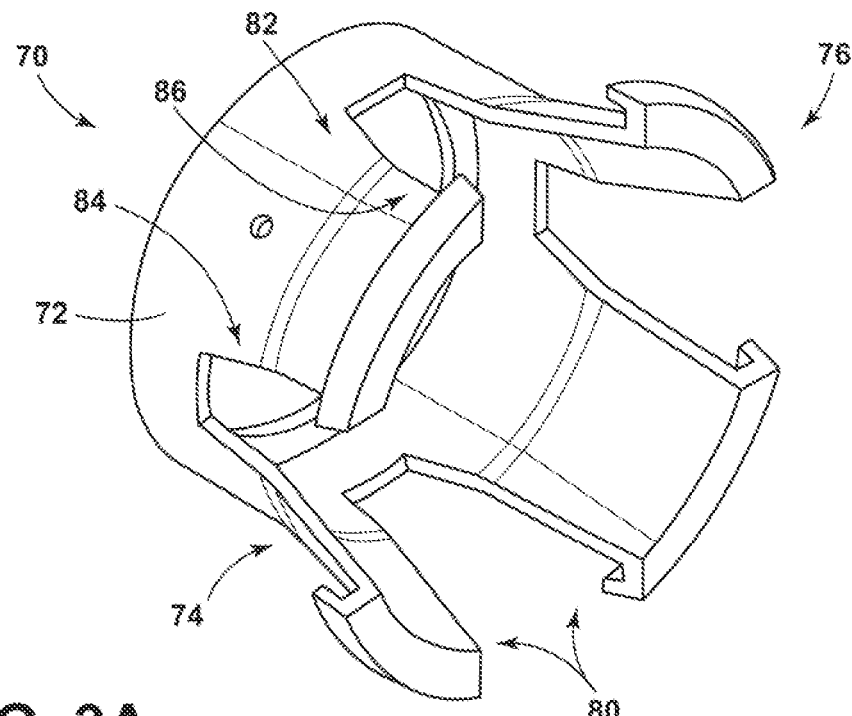
FIG. 3A is a perspective view generally illustrating portions of a retainer sleeve, in accordance with embodiments of the present disclosure.
Figure 3B:
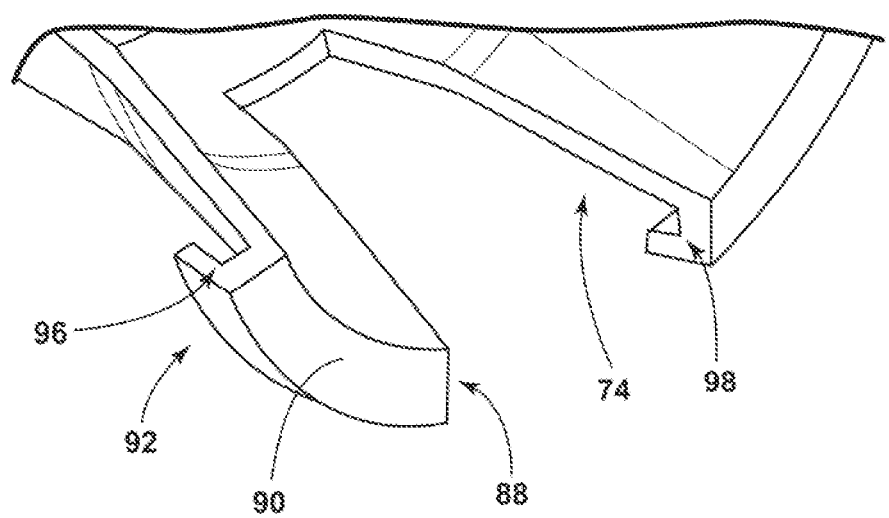
FIG. 3B is an enlarged perspective view generally illustrating portions of a retainer sleeve, in accordance with embodiments of the present disclosure.
Figure 4:
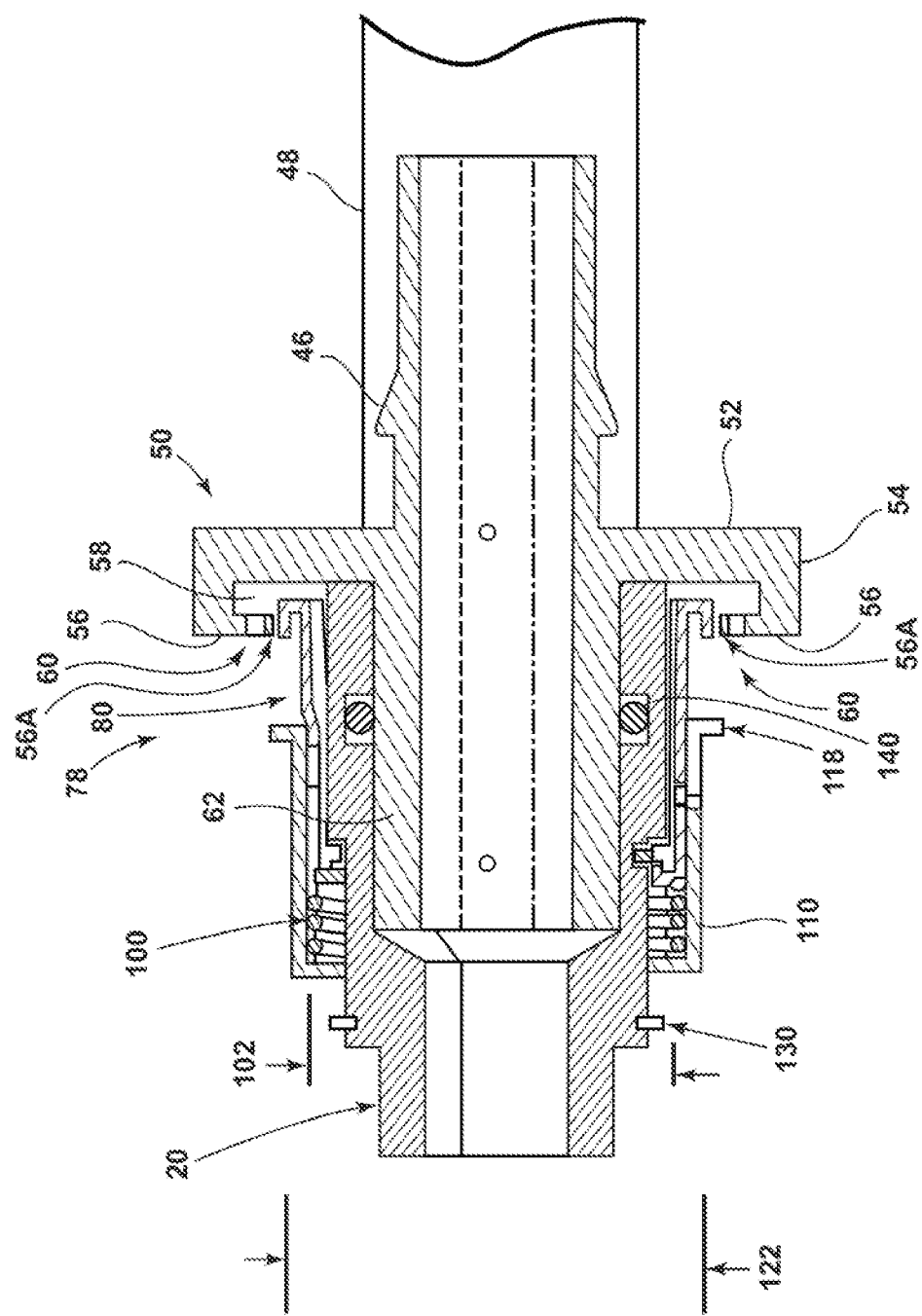
FIG. 4 is a cross-sectional view generally illustrating portions of a coupling assembly, in accordance with embodiments of the present disclosure.
Figure 6A:
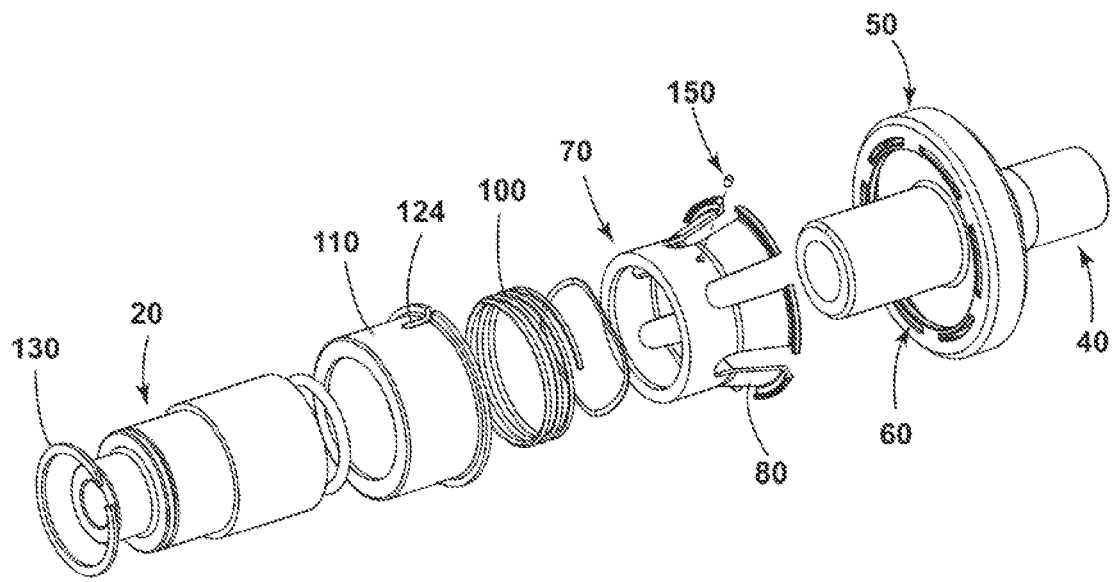
FIGS. 6A and 6B are perspective views of portions of a disassembled coupling assembly, in accordance with embodiments of the present disclosure.
Figure 6B:
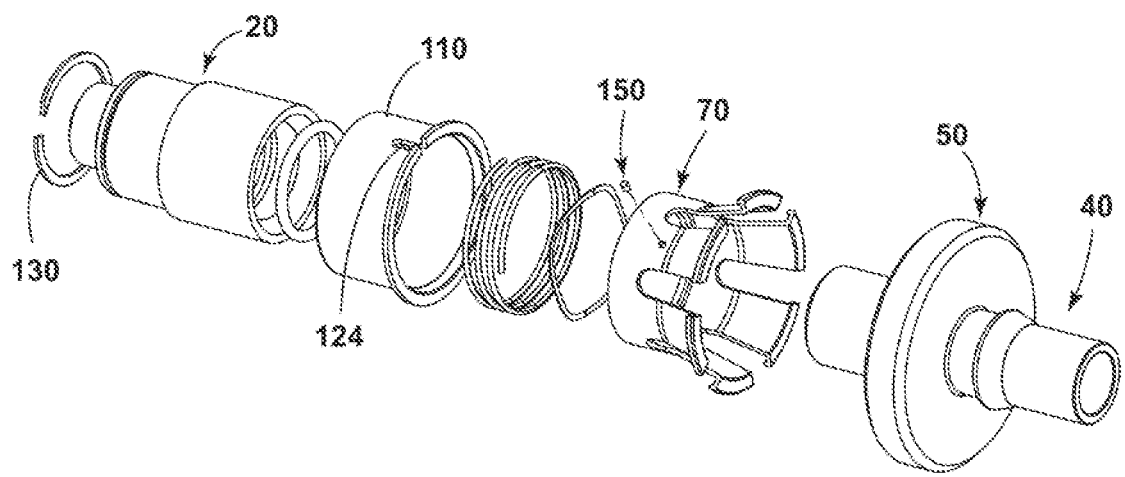

In embodiments, as generally illustrated in FIGS. 1A-4, retainer sleeve 70 may generally be disposed around and about an outer surface of first member 20. Retainer sleeve 70 may include a first portion 72 and/or a second portion 74. First portion 72 may include a generally annular shape, may be fixed to body 22, and/or may be configured to translate or slide along an outer surface of body 22. Second portion 74 may be configured to flex and/or deflect between a radially outward position 76 (e.g., as generally shown in FIGS. 1-3B) and a radially inward position 78 (e.g., as generally shown in FIG. 4).

Figure 1B:
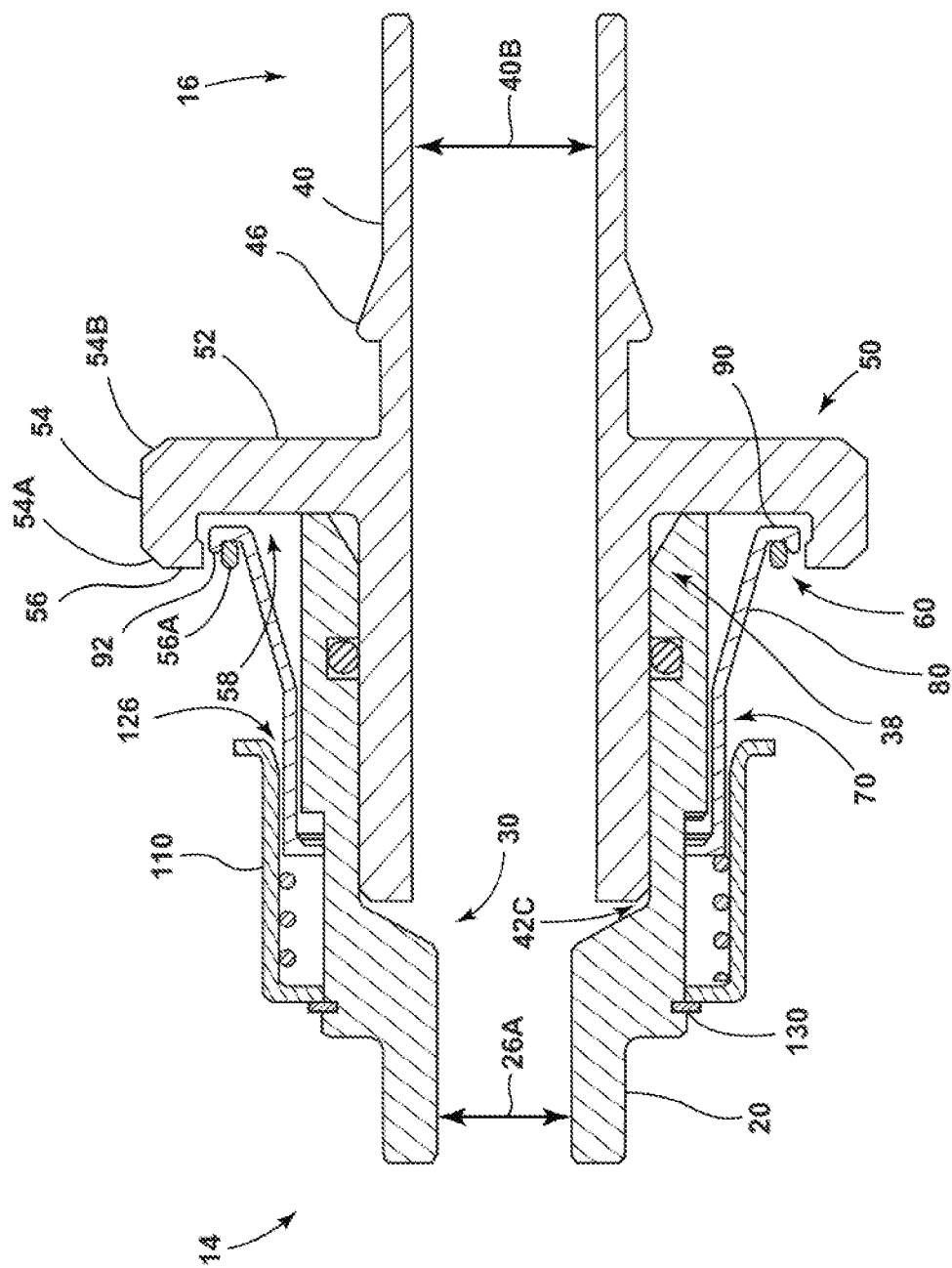

In embodiments, such as generally illustrated in FIGS. 1A and 3A, second portion 74 may include one or more locking lugs 80, that may comprise formations configured to engage slots 60 in second member flange 50. With embodiments, a locking lug 80 may be generally disposed at an angle to (e.g., not parallel with) central axis 12 and/or the angle may generally correspond to the locking lug 80 being in an engaged position. Locking lugs 80 may be configured to be generally flexible, elastic and/or resilient (e.g., locking lugs 80 may include one or more elastic and/or resilient materials). Locking lugs 80 may be configured to be biased toward radially outward position 76, which may correspond to an engaged position depending on the axial position of retainer sleeve 70.

In embodiments, locking lugs 80 may include one or more of a variety of shapes, sizes, and/or configurations. In embodiments, a locking lug 80 may include a generally trapezoidal shape, which may include a relatively wide portion 82 near first portion 72, two angled sides 84, 86, and a protruding portion 88. In embodiments, protruding portion 88 may include a hook configuration, which may include a radially extending portion 90 that may extend radially outward and/or an axially extending portion 92 that may generally extend axially from the end of radially extending portion 90 in the axial direction. It should be understood that the direction at which certain portions extend (e.g., portions 90, 92) may depend on whether retainer sleeve 70 is in an engaged position or a disengaged position. Axially extending portion 92 of protruding portion 88 may be configured to positively engage and/or be inserted into slots 60 of second member flange 50. In embodiments, axially extending portions 92 may include a radial length that is shorter than the width/axial length of slots 60 so that axially extending portions 92 do not extend all of the way through slots. In embodiments, axially extending portions 92 may include a length that is longer than the width of slots so that axially extending portions 92 do extend all of the way through slots 60, which may allow for visual confirmation of engagement between retainer sleeve 70 and second member 40.

In embodiments, such as generally illustrated in FIG. 3B, protruding portion 88 may be configured to ease engagement and/or disengagement of axially extending portions 92 and slots 60, and/or protruding portion 88 may be configured such that axially extending portions 92 may disengage slots 60 even if retainer sleeve 70 does not first move in the axial direction 12A toward second end 16 (e.g., if retainer sleeve 70 is fixed to first member 20 and/if retainer sleeve 70 malfunctions). For example, and without limitation, protruding portion 88 may include a curved portion 96 and/or an angled portion 98. Curved portion 96 and/or angled portion 98 may be generally disposed between radially extending portion 90 and axially extending portion 92.

In embodiments, spring 100 may comprise a retainer sleeve spring and/or may be referred to herein as retainer sleeve spring 100. Spring 100 may be generally disposed around the outside of body 22 of first member 20. In an engaged position of first member 20 and second member 40, spring 100 may be generally disposed such that is overlaps with both of first member 20 and second member 40 in the radial direction 12B (e.g., as generally illustrated in FIG. 1A). In embodiments, spring 100 may be disposed radially between release sleeve 110 and first member 20. For example, and without limitation, spring 100 may include a diameter 102 that is larger than the outer diameter 32 of at least a portion of first member 20 and/or that is smaller than the diameter 122 of release sleeve 110.

In embodiments, spring 100 may be configured to apply a spring force to retainer sleeve 70, which may bias retainer sleeve 70 in a direction toward first end 14 of coupling assembly 10. In embodiments, spring 100 may be in contact with, connected to, and/or fixed to retainer sleeve 70. The spring force provided by spring 100 may help keep retainer sleeve 70 engaged with flange 50, which may include locking lugs 80 remaining engaged with slots 60, which may help prevent first member 20 and second member 40 from becoming accidentally and/or unintentionally disengaged from each other. Additionally or alternatively, in embodiments, spring 100 may be configured to apply a spring force to release sleeve 110 in a direction generally toward first end 14 of coupling assembly 10, which may help prevent release sleeve 110 from accidentally and/or unintentionally releasing retainer sleeve 70.

In embodiments, release sleeve 110 may include one or more of a variety of shapes, sizes, and/or configurations. Release sleeve 110 may include a first end 112 and/or a second end 114. In embodiments, release sleeve 110 may include a generally cylindrical shape.

In embodiments, such as generally illustrated in FIG. 2D, release sleeve 110 may include an inner flange 116 and/or an outer flange 118. Inner flange 116 may extend inwardly in the radial direction 12B. Inner flange 116 may be disposed at or near an end (e.g., first end 112) of release sleeve 110 and/or outer flange 118 may generally be disposed at or near another end (e.g., second end 114) of release sleeve 110. In embodiments, first end 112 of release sleeve 110 may be disposed closer to first end 14 of coupling assembly 10 than second end 114 of release sleeve 110. In embodiments, release sleeve 110 may include an angled and/or chamfered portion 126 that may promote engagement between release sleeve 110 and retainer sleeve 70 (see, e.g., FIG. 1).

In embodiments, inner flange 116 may be configured to cooperate with a release sleeve lock ring 130. Release sleeve lock ring 130 may be disposed in a groove of first member 20 and/or may extend above the surface of first member 20 to prevent axial movement of release sleeve 110 in at least one direction (e.g., the axial direction toward first end 14 of coupling assembly 10).

In embodiments, outer flange 118 may extend outwardly in radial direction 12B. Outer flange 118 may be configured to cooperate with and/or engage retainer sleeve 70 to selectively control engagement between retainer sleeve 70 and flange 50. For example, and without limitation, release sleeve 110 may be moved in axial direction 12A (e.g., by a hand or hands of an operator/user) toward second end 16 of coupling assembly 10 and outer flange 118 may push retainer sleeve 70 toward second end 16 and/or outer flange 118 may engage locking lugs 80, forcing locking lugs 80 to deflect radially inward. If release sleeve 110 is moved a sufficient distance toward second end 16, release sleeve 110 may cause locking lugs 80 to deflect sufficiently radially inward such that axially extending portions 92 may disengage from slots 60 and/or locking lugs 80 may flex such that they are radially inward of flange third portion 56 (e.g., inward of radially inward portion 56A) and/or slots 60, which may allow first member 20 and second member 40 to disengage from each other.

In embodiments, first member 20 and/or second member 40 may include a recess and/or groove 34 that may be configured to receive at least a portion of a seal 140 (e.g., an O-ring). Seal 140 may provide a fluid seal between first member 20 and second member 40.

In embodiments, retainer sleeve 70, release sleeve 110, and/or flange 50 may be configured to cooperate to selectively couple first member 20 with second member 40, which may permit fluid flow through first and second members 20, 40. For example, if first member 20 and second member 40 are not coupled with each other, first member 20 and second member 40 may be brought into alignment (e.g., first member axis 20A and second member axis 40C may be generally aligned) and/or into contact with each other. Initially, locking lugs 80 may be disposed in a radially outward position 76, which may correspond to protruding portion 88 being disposed radially outward of the most radially inward portion 56A of flange third portion 56, which may prevent first member 20 and second member 40 from being pushed into coupling. Release sleeve 110 may then be activated and/or pushed toward retainer sleeve 70, which may cause locking lugs 80 to deflect sufficiently radially inward (e.g., to radially inward position 78) to slide under most radially inward portion 56A of flange third portion 56. Once axially extending portion 92 of locking lugs 80 slides axially into cavity 58, release sleeve 110 may be deactivated and/or moved toward first end 14 (e.g., spring 100 may provide sufficient spring force to move release sleeve 110 toward first end 14 once hands of the operator are removed/loosened from release sleeve 110). As release sleeve 110 moves toward first end 14, locking lugs 80 may return to radially outward position 76 and axially extending portions 92 may be aligned with slots 60. In embodiments, if release sleeve 110 moves a sufficient distance toward first end 14, spring 100 may cause retainer sleeve 70 to move toward first end 14, which may cause axially extending portions 92 to engage slots 60, coupling first member 20 and second member 40. If release sleeve 110 returns to its original position, which may be adjacent to and/or in contact with release sleeve lock ring 130, contact between release sleeve 110 and lock ring 130 may provide a visual and/or tactile indication in that first member 20 and second member 40 have been successfully coupled.

In embodiments, a similar process may be applied to decouple first member 20 and second member 40. For example, release sleeve 110 may be moved toward second end 16 to cause locking lugs 80 to disengage slots 60, which may include release sleeve 110 moving retainer sleeve 70 toward second end 16 and/or may include release sleeve 110 deflecting locking lugs 80 radially inward of most radially inward portion 56A of flange third portion 56. First member 20 and second member 40 may then be decoupled from each other.

In embodiments, cooperation between retainer sleeve 70, release sleeve 110, and/or flange 50 may be configured such than an operator and/or user (e.g., a technician) may be able to couple and/or decouple first member 20 and second member 40 with the operator's hands, independent of and/or without any special tools.

In embodiments, as generally illustrated in FIGS. 5A, 5B, 6A, 6B, and 7, coupling assembly 10 may include features to compensate for vibrations that may be caused by external forces (e.g., vibration of an aircraft). In embodiments, retainer sleeve 70 and/or release sleeve 110 may include at least one vibration lock pin 150. For example, and without limitation, a vibration lock pin 150 may be connected and/or secured to retainer sleeve 70 at or near first portion 72. Vibration lock pin 150 may extend from the outer surface of retainer sleeve 70 in the radial direction 12B and/or may be configured to selectively engage outer flange 118 of release sleeve 110. In embodiments, vibration lock pin 150 may prevent and/or restrict axial movement of release sleeve toward the second end 16 of coupling assembly 10 if vibration lock pin 150 is not aligned (e.g., radially) with a corresponding slot 124 of release sleeve 110, which may prevent release sleeve 110 from causing locking lugs 80 to deflect. Release sleeve 110 may be configured such that it may be rotated (e.g., by a user and/or operator desiring to couple and/or decouple first member 20 and second member 40) to selectively align (e.g., radially and/or circumferentially) slot 124 with vibration lock pin 150. For example, and without limitation, to decouple first member 20 and second member 40 from each other, an operator may slide release sleeve 110 in the axial direction 12A toward the second end 16 (which may or may not cause axial movement of retainer sleeve 70) until outer flange 118 contacts vibration lock pin 150, rotate release sleeve 110 relative to central axis 12 until slot 124 is aligned (e.g., radially and/or circumferentially) with vibration lock pin 150, and/or then continue to slide release sleeve 110 in the axial direction 12A toward second end 16, which may cause outer flange 118 to engage locking lugs 80. If outer flange 118 engages locking lugs 80, locking lugs 80 may deflect radially inward of most radially inward portion 56A of flange third portion 56, at which point the operator may decouple first member 20 and second member 40 from each other. Such a configuration may be beneficial to help prevent vibrations from causing release sleeve 110 to move far enough in the axial direction 12A toward second end 16 to deflect locking lugs 80. In embodiments, retainer sleeve 70 and/or release sleeve 110 may include a plurality of (two or more) vibration lock pins 150. If multiple vibration lock pins 150 are employed, such pins may be, for example and without limitation, equidistantly spaced about the periphery of the relevant component (e.g., two pins may be space 180 degrees apart). In embodiments, the other of release sleeve 110 and/or retainer sleeve 70 may include a plurality of slots 124 that may correspond to and/or be configured to receive one or more of the plurality of vibration lock pins 150. In embodiments, coupling assembly 10 may comply with and/or exceed one or more vibration standards, such as, for example, aerospace standard RTCA/ DO-160G and/or automotive standard SAE J115. In embodiments, vibration lock pins 150 may, at least in part, permit coupling assembly 10 to comply with such standards.

Figure 7:
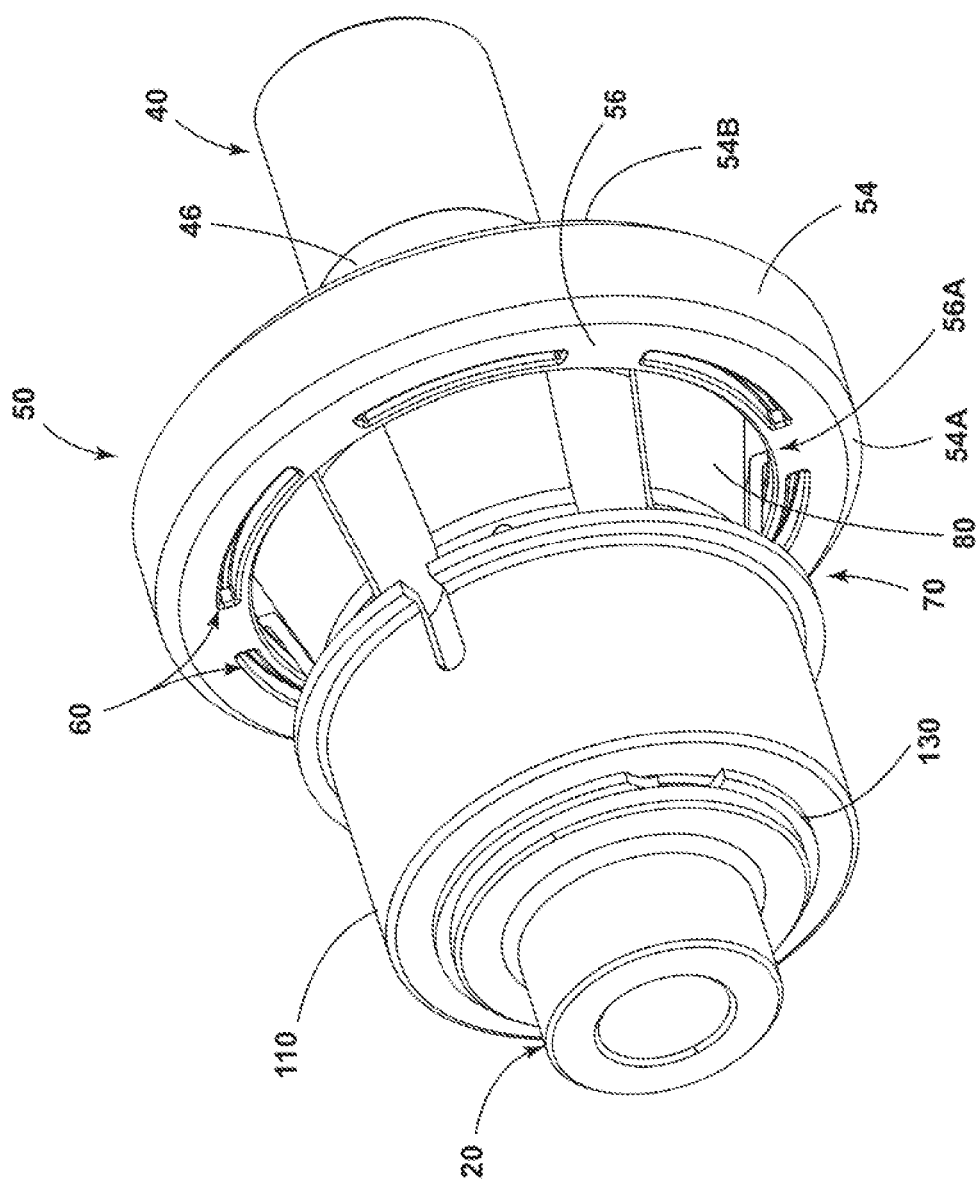
FIG. 7 is a perspective view generally illustrating portions of a coupling assembly, in accordance with embodiments of the present disclosure.

In embodiments, such as generally illustrated in FIG. 7, a coupling assembly 10, including first member 20, second member 40 with flange 50 having slots 60, retainer sleeve 70 with locking lugs 80, release sleeve 110, and release sleeve lock ring 130. In embodiments, axially extending portions 92 of locking lugs 80 may not extend all of the way through slots 60.

In embodiments, engagement between retainer sleeve 70 and flange 50 may be configured such that forces applied in opposite directions (e.g., a first force applied in the axial direction 12A toward first end 14 and a second force applied in the axial direction 12A toward the second end 16) may help maintain the engagement. In embodiments, fluid flowing through first member 20 and/or second member 40 may cause forces to be applied to first member 20 and second member 40 in opposite axial directions, which may effectively act as a locking force to help maintain the engagement between retainer sleeve 70 and flange 50. For example, and without limitation, increased pressure of the fluid flowing through first members and second members 40 may increase the locking force between retainer sleeve 70 and flange 50. Such a configuration may be contrary to conventional designs in which increased fluid pressure may be undesirable and/or may act to disengage members of a coupling.

In embodiments, coupling assembly 10 may be configured to increase the locking force caused by fluid flowing through first member 20 and second member 40. For example, and without limitation, decreasing diameter 26A of first portion 26 of first member 20 may increase the pressure of the fluid as it flows through first member 20, which may increase the locking force. A corresponding pressure drop across coupling assembly 10 may result from decreasing diameter 26A. In embodiments, such as generally illustrated in FIG. 1B, diameter 26A of first portion may be smaller than diameter 40B of second member 40, which may increase the locking force and/or improve engagement.

In embodiments, first member 20, second member 40, retainer sleeve 70, and/or release sleeve 110 may include one or more alignment features that may be configured to help an operator align first member 20 and second member 40 for coupling. In embodiments, one or more of first member 20, second member 40, retainer sleeve 70, and/or release sleeve 110 may include corresponding alignment pins and alignment recesses, and/or may include corresponding flat portions (e.g., flat portions 36, 62, 94, 120). For example, and without limitation, retainer sleeve 70 and/or first member 20 may include corresponding flat portions 94, 36 that may be configured to prevent and/or restrict relative rotation between first member 20 and retainer sleeve 70. Flat portions may also provide tactile feedback to an operator.

It should be understood that descriptions of a spring (e.g., spring 100) may include one or more of a variety elements that may be configured to provide a biasing force, such as, for example, a coil spring, a leaf spring, a resilient element (e.g., a rubber bellows), and/or similar elements.

It should be understood that coupling assembly 10 may be used in one or more of a variety of applications, including, without limitation, aerospace, automotive, and/or maritime/ naval). It should also be understood that coupling assembly 10 is not limited to a particular size and may be scaled for one or more of a variety of applications.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A coupling assembly, comprising:
   a first member;
   a second member, the second member including a second member flange;
   a release sleeve movably connected to the first member;
   a retainer sleeve, and
   a spring, the spring configured to apply a spring force to the retainer sleeve;
   wherein the spring force biases the retainer sleeve into a positive engagement with the second member flange; and a portion of a body of the second member is disposed within a portion of a body of the first member, and the second member flange extends radially from the body of the second member radially beyond the body of the first member; and wherein the release sleeve includes an outer flange disposed at an end of the release sleeve adjacent the retainer sleeve, the outer flange configured to at least one of cooperate and engage the retainer sleeve to selectively control engagement between the retainer sleeve and the second member flange.

2. The coupling assembly of claim 1, including a release sleeve lock ring configured to restrict movement of the release sleeve in at least one direction.

3. The coupling assembly of claim 1, where the spring is configured to apply the spring force in an axial direction away from the second member.

4. The coupling assembly of claim 1, wherein the retainer sleeve includes a vibration lock pin and the release sleeve includes a release slot that is configured to receive the lock pin.

5. The coupling assembly of claim 4, wherein the first member and the second member may be decoupled from each other if the release slot is aligned with the vibration lock pin.

6. The coupling assembly of claim 1, wherein the first member is configured as an adapter and the second member is configured as a nipple.

7. The coupling assembly of claim 1, wherein an inner diameter of the first member is smaller than an inner diameter of second member.

8. The coupling assembly of claim 7, wherein the smaller inner diameter of the first member is configured to increase fluid pressure and increase a locking force between the first member and the second member.

9. The coupling assembly of claim 1, wherein the retainer sleeve includes a plurality of flexible locking lugs configured to engage a plurality of slots disposed in the second member flange.

10. The coupling assembly of claim 9, wherein the spring force biases the flexible locking lugs of the retainer sleeve into the positive engagement with the second member flange via the plurality of second member flange slots.

11. The coupling assembly of claim 9, wherein at least one of the plurality of flexible locking lugs includes a hook configuration.

12. The coupling assembly of claim 1, wherein the release sleeve includes an inner flange disposed at an end of the release sleeve opposite the outer flange, and extending radially inwardly.

13. The coupling assembly of claim 12, further comprising a release sleeve lock ring extending above a surface of the first member, the inner flange of the release sleeve being configured to cooperate with the release sleeve lock ring to prevent axial movement of the release sleeve in at least one direction.

14. A coupling assembly, comprising:
   an adapter;
   a nipple, the nipple including a flange, the flange including a plurality of slots;
   a release sleeve movably connected to the adapter;
   a release sleeve lock ring extending above a surface of the first member;
   a retainer sleeve, the retainer sleeve including a plurality of flexible locking lugs; and
   a spring, the spring configured to apply a spring force to the retainer sleeve;
   wherein a portion of a body of the adapter is disposed within a portion of a body of the nipple, and the flange extends radially from the body of the nipple radially beyond the body of the adapter; and wherein the release sleeve includes an inner flange disposed at a first end of the release sleeve and extending radially inwardly, the spring configured to apply a force to the release sleeve at the inner flange in a direction toward the first end.

15. The coupling assembly of claim 14, wherein the spring force biases the retainer sleeve into a positive engagement with the plurality of nipple flange slots.

16. The coupling assembly of claim 14, wherein the spring force is directed away from the nipple.

17. The coupling assembly of claim 14, wherein the retainer sleeve includes a vibration lock pin and the release sleeve includes a release slot that is configured to receive the lock pin.

18. The coupling assembly of claim 14, wherein an inner diameter of the adapter is configured to increase pressure of a fluid flowing through the adapter, and the increased pressure increases a locking engagement of the adapter and the nipple.

19. The coupling assembly of claim 18, wherein the inner diameter of the adapter is smaller than an inner diameter of nipple.

20. The coupling assembly of claim 14, wherein the flange defines a semi-enclosed cavity configured to receive at least portions of the flexible locking lugs.

* * * * *